United States Patent
Watkins (10) Patent No.: US 9,848,750 B1
(45) Date of Patent: Dec. 26, 2017

(54) MANUALLY-OPERATED FLOOR SWEEPER

(71) Applicant: Eric Watkins, Raleigh, NC (US)

(72) Inventor: Eric Watkins, Raleigh, NC (US)

( * ) Notice: Subject to any disclaimer, the term of this patent is extended or adjusted under 35 U.S.C. 154(b) by 394 days.

(21) Appl. No.: 14/754,800

(22) Filed: Jun. 30, 2015

(51) Int. Cl.
| | |
|---|---|
| *A47L 11/22* | (2006.01) |
| *E01H 1/00* | (2006.01) |
| *A47L 11/40* | (2006.01) |
| *E01H 1/04* | (2006.01) |
| *A01G 1/12* | (2006.01) |

(52) U.S. Cl.
CPC .............. *A47L 11/22* (2013.01); *A01G 1/125* (2013.01); *A47L 11/4013* (2013.01); *A47L 11/4041* (2013.01); *A47L 11/4069* (2013.01); *E01H 1/045* (2013.01)

(58) Field of Classification Search
CPC .. E01H 1/00; E01H 1/04; E01H 1/045; A47L 11/22; A47L 11/4013; A01G 1/125
See application file for complete search history.

(56) References Cited

U.S. PATENT DOCUMENTS

| | | | |
|---|---|---|---|
| 517,709 A | 4/1894 | Tilton | |
| 3,947,912 A | 4/1976 | Michaels | |
| 4,974,283 A | 12/1990 | Holsten | |
| 5,390,387 A | 2/1995 | Dube | |
| 5,848,521 A | 12/1998 | Kobayashi | |
| D405,567 S | 2/1999 | Kent | |
| 5,896,611 A * | 4/1999 | Haaga ................ | A47L 11/22 15/42 |
| 7,320,147 B2 | 1/2008 | Eberle | |
| 7,716,773 B1 | 5/2010 | Pahl | |
| 2007/0204414 A1 | 9/2007 | Haaga | |

FOREIGN PATENT DOCUMENTS

WO    WO2005106128 A1    11/2005

\* cited by examiner

*Primary Examiner* — Shay Karls
(74) *Attorney, Agent, or Firm* — Kyle A. Fletcher, Esq.

(57) ABSTRACT

The manually operated floor sweeper is a manually powered cleaning unit that replaces the standard push broom. Designed for indoor and outdoor use, the manually operated floor sweeper provides a plurality of brushes that move dirt and trash to a hopper, which transports the dirt and trash to a receptacle. The manually operated floor sweeper comprises a plurality of brushes, a hopper system, a drive system, a gearing system and a body.

17 Claims, 9 Drawing Sheets

MANUALLY-OPERATED FLOOR SWEEPER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of cleaning machines and implements, more specifically, a manually operated floor cleaner.

SUMMARY OF INVENTION

The manually operated floor sweeper is a manually powered cleaning unit that replaces the standard push broom. Designed for indoor and outdoor use, the manually operated floor sweeper provides a plurality of brushes that move dirt and trash to a hopper which transports the dirt and trash to a receptacle.

These together with additional objects, features and advantages of the manually operated floor sweeper will be readily apparent to those of ordinary skill in the art upon reading the following detailed description of the presently preferred, but nonetheless illustrative, embodiments when taken in conjunction with the accompanying drawings.

In this respect, before explaining the current embodiments of the manually operated floor sweeper in detail, it is to be understood that the manually operated floor sweeper is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the manually operated floor sweeper.

It is therefore important that the claims be regarded as including such equivalent construction insofar as they do not depart from the spirit and scope of the manually operated floor sweeper. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
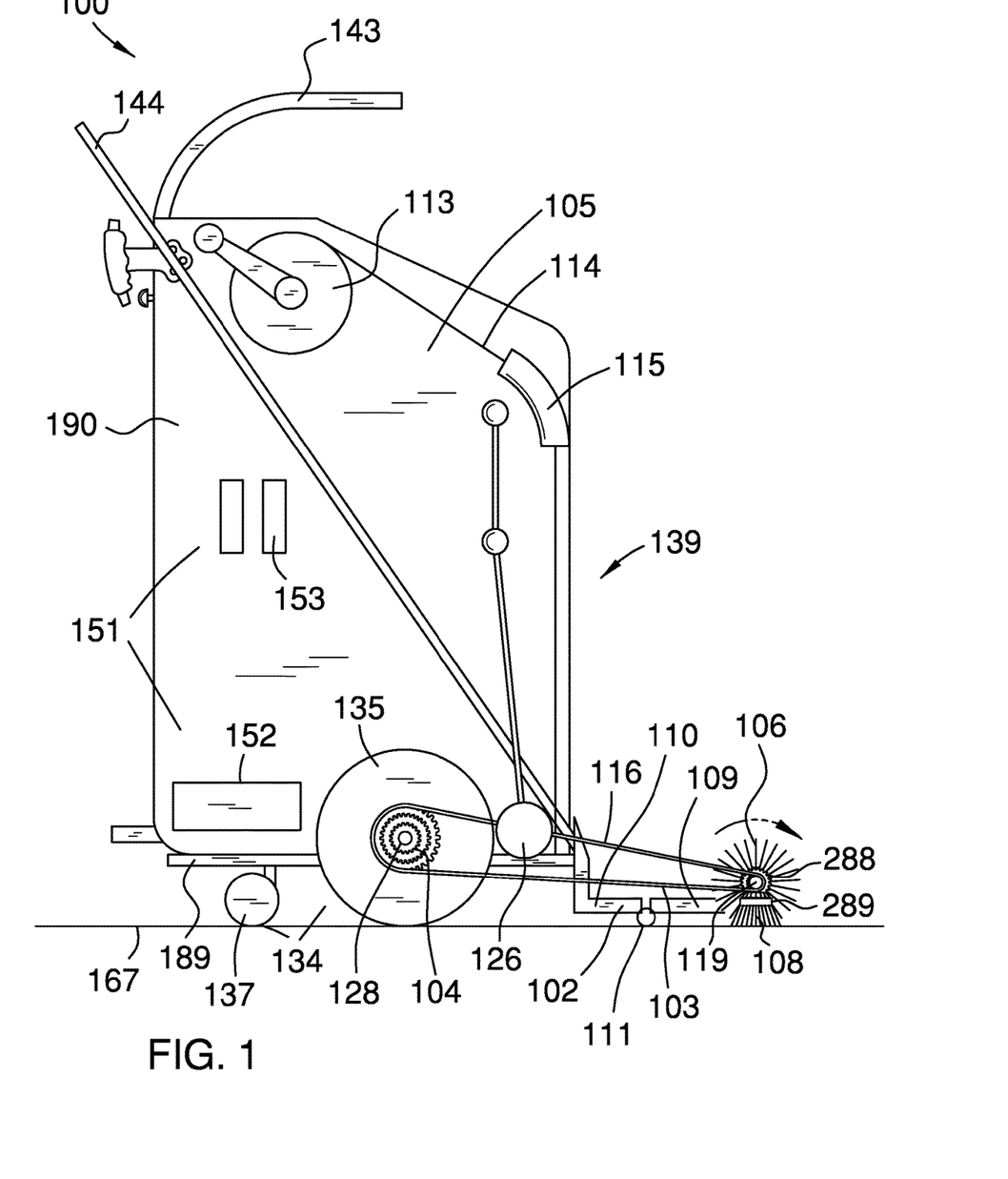
FIG. 1 is a right side view of an embodiment of the disclosure.
Figure 2:
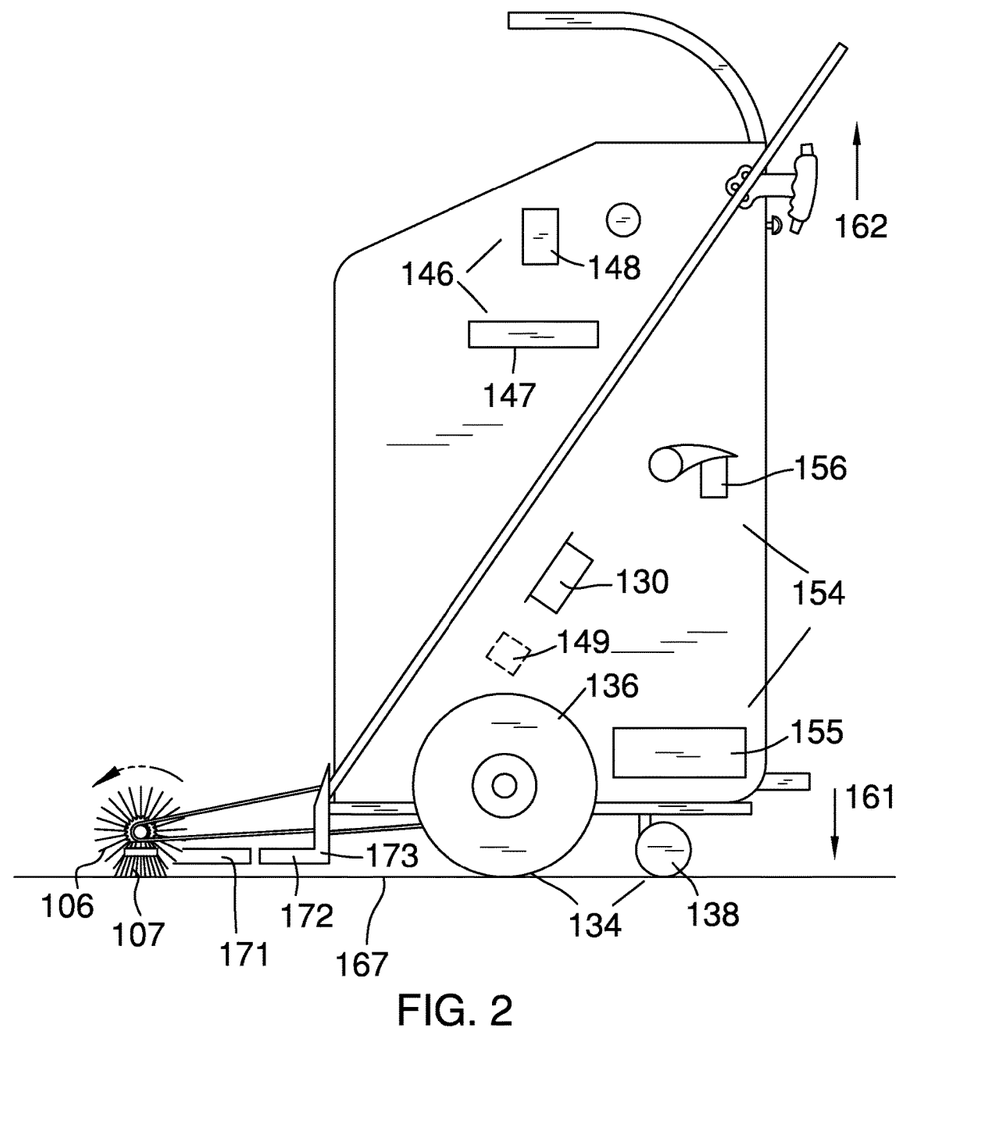
FIG. 2 is a left side view of an embodiment of the disclosure.
Figure 3:
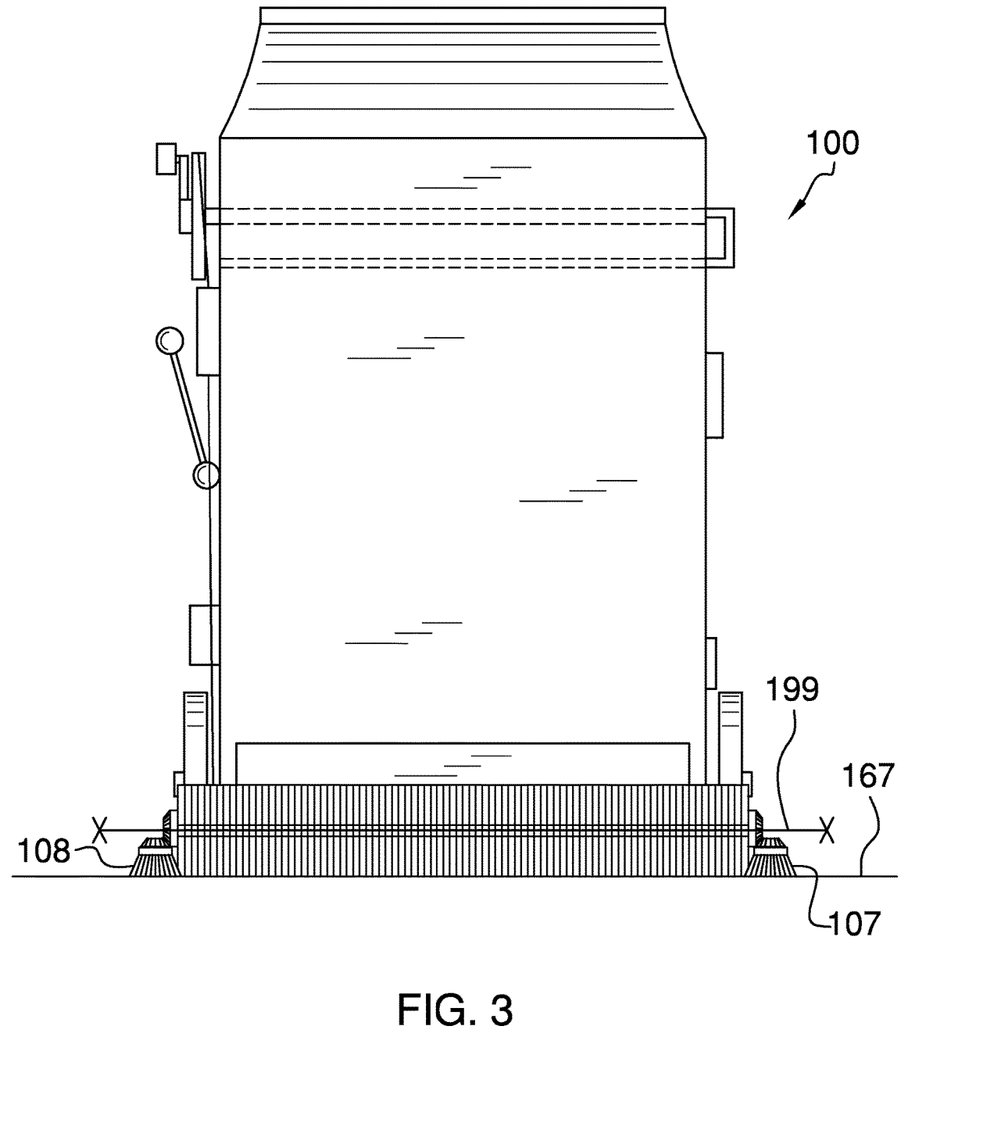
FIG. 3 is a front view of an embodiment of the disclosure.
Figure 4:
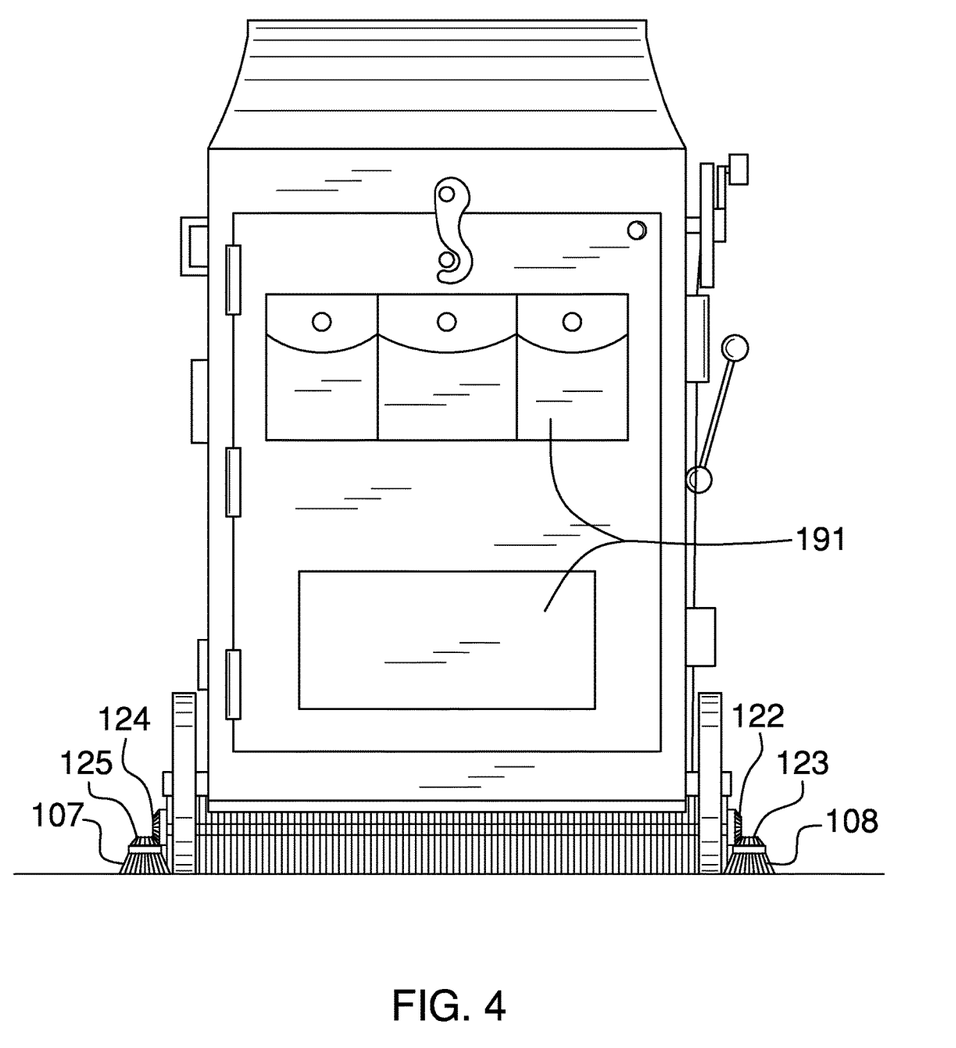
FIG. 4 is a back view of an embodiment of the disclosure.
Figure 5:
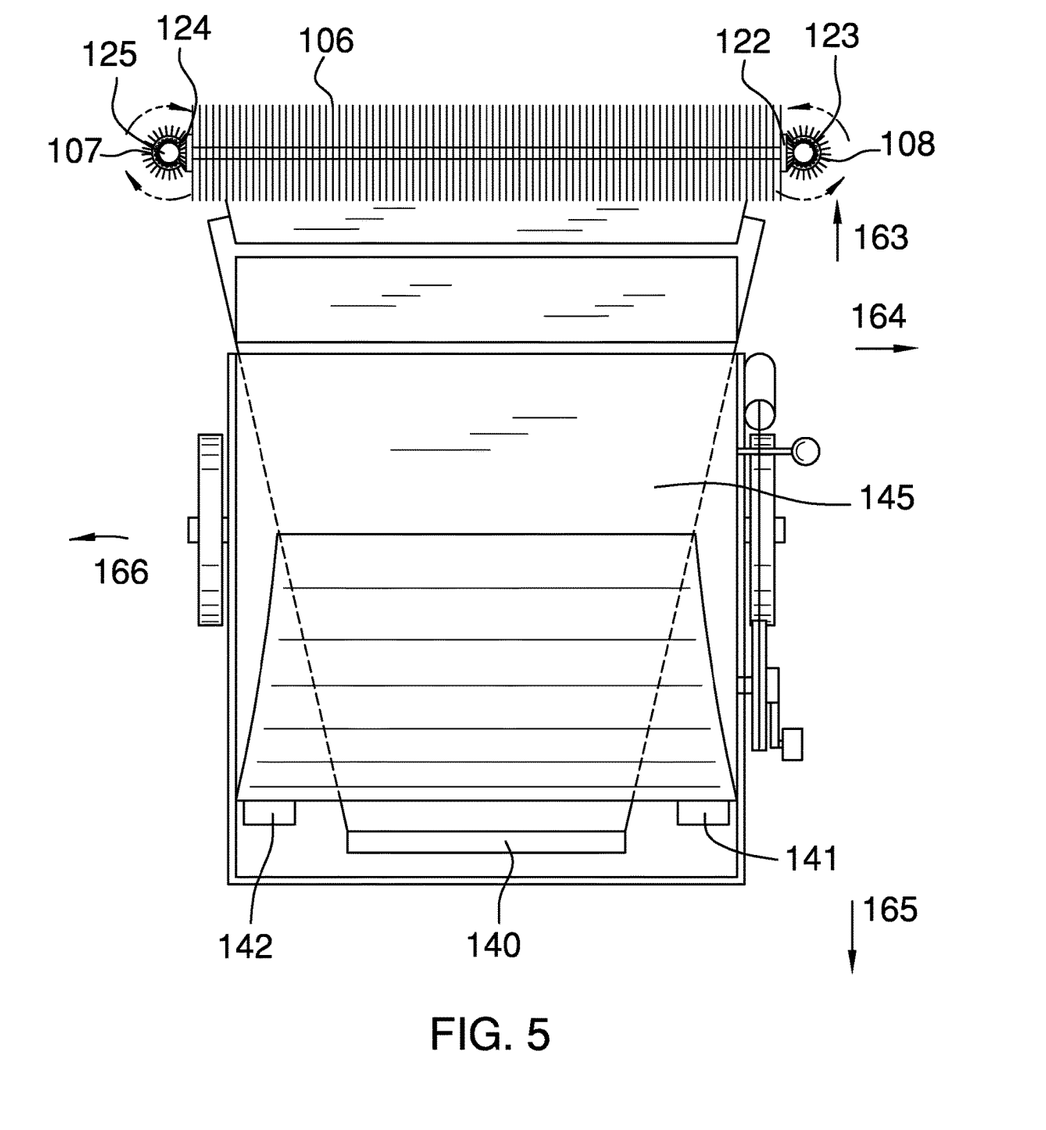
FIG. 5 is a top view of an embodiment of the disclosure.
Figure 6:
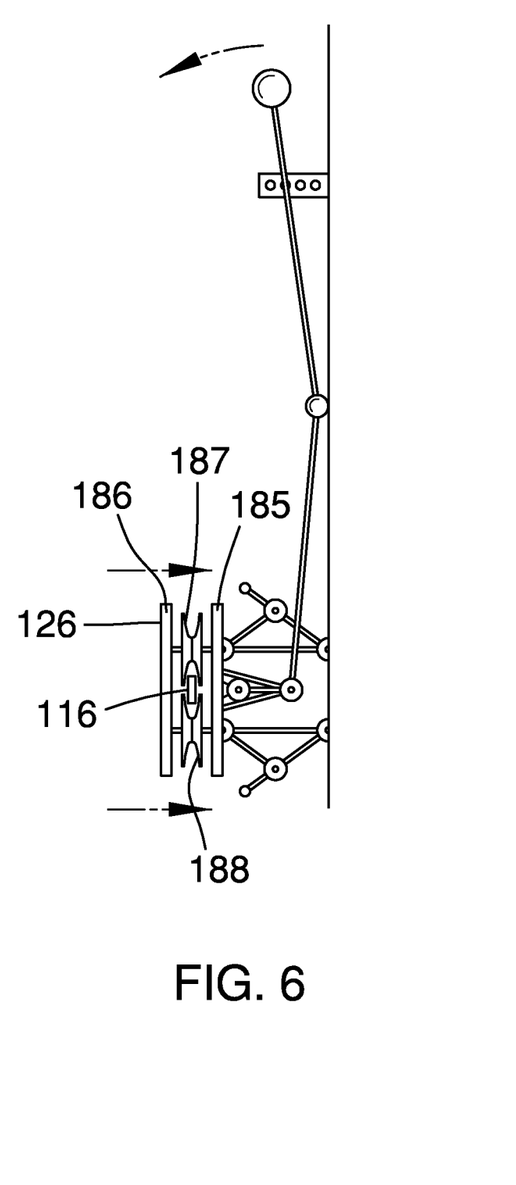
FIG. 6 is a detail view of an embodiment of the disclosure.
Figure 7:
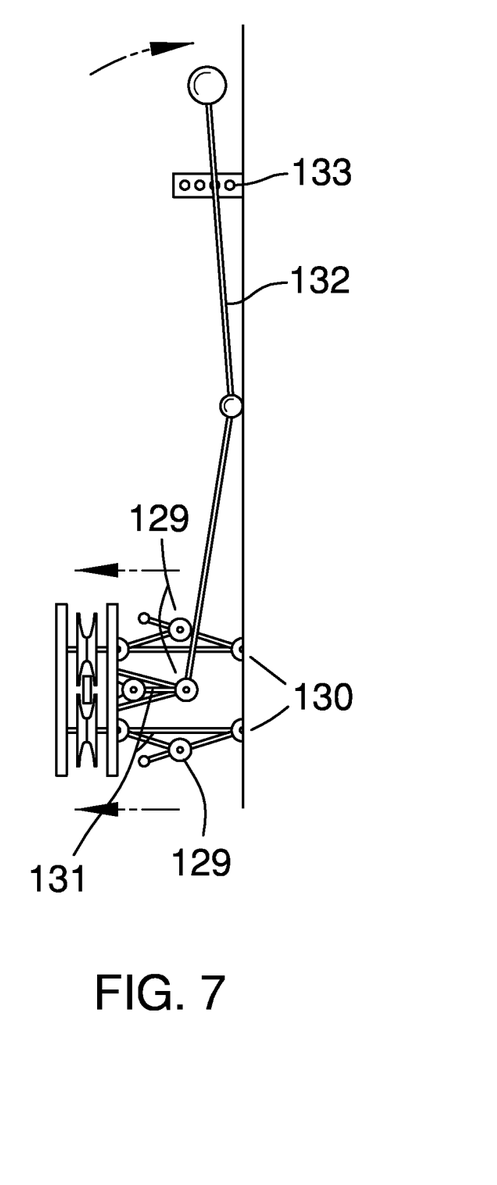
FIG. 7 is a detail view of an embodiment of the disclosure.
Figure 8:
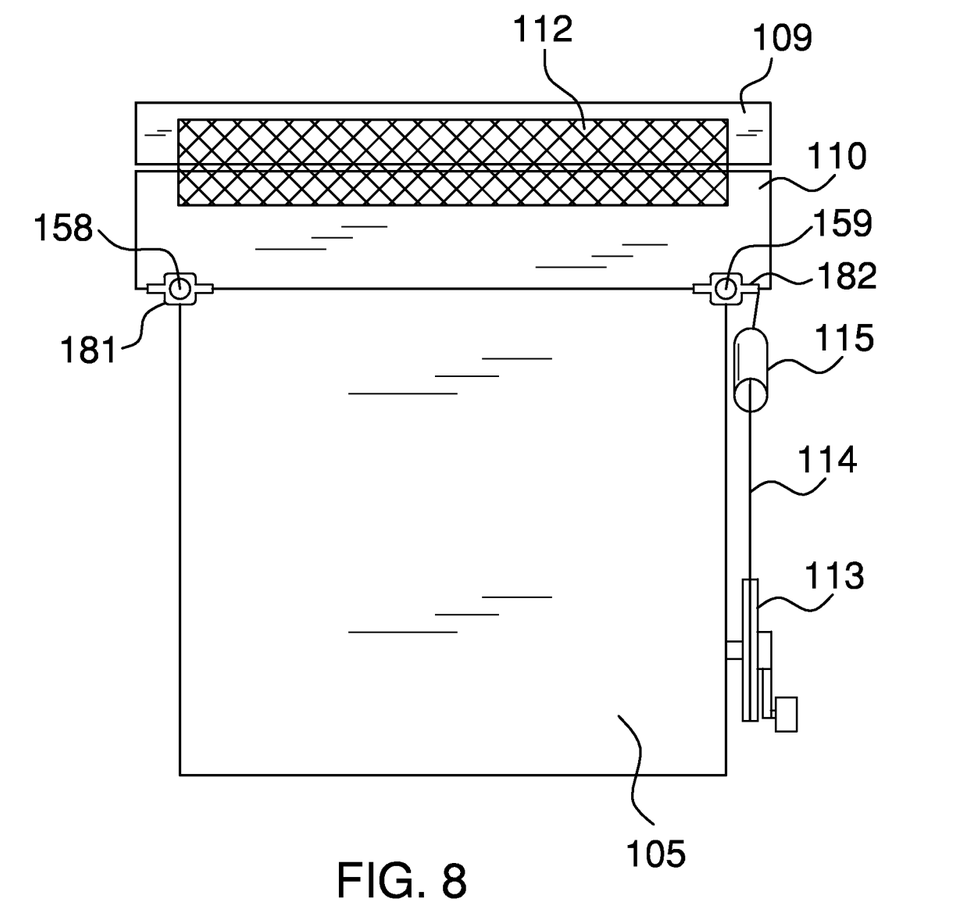
FIG. 8 is a detail view of an embodiment of the disclosure.
Figures 9, 10:
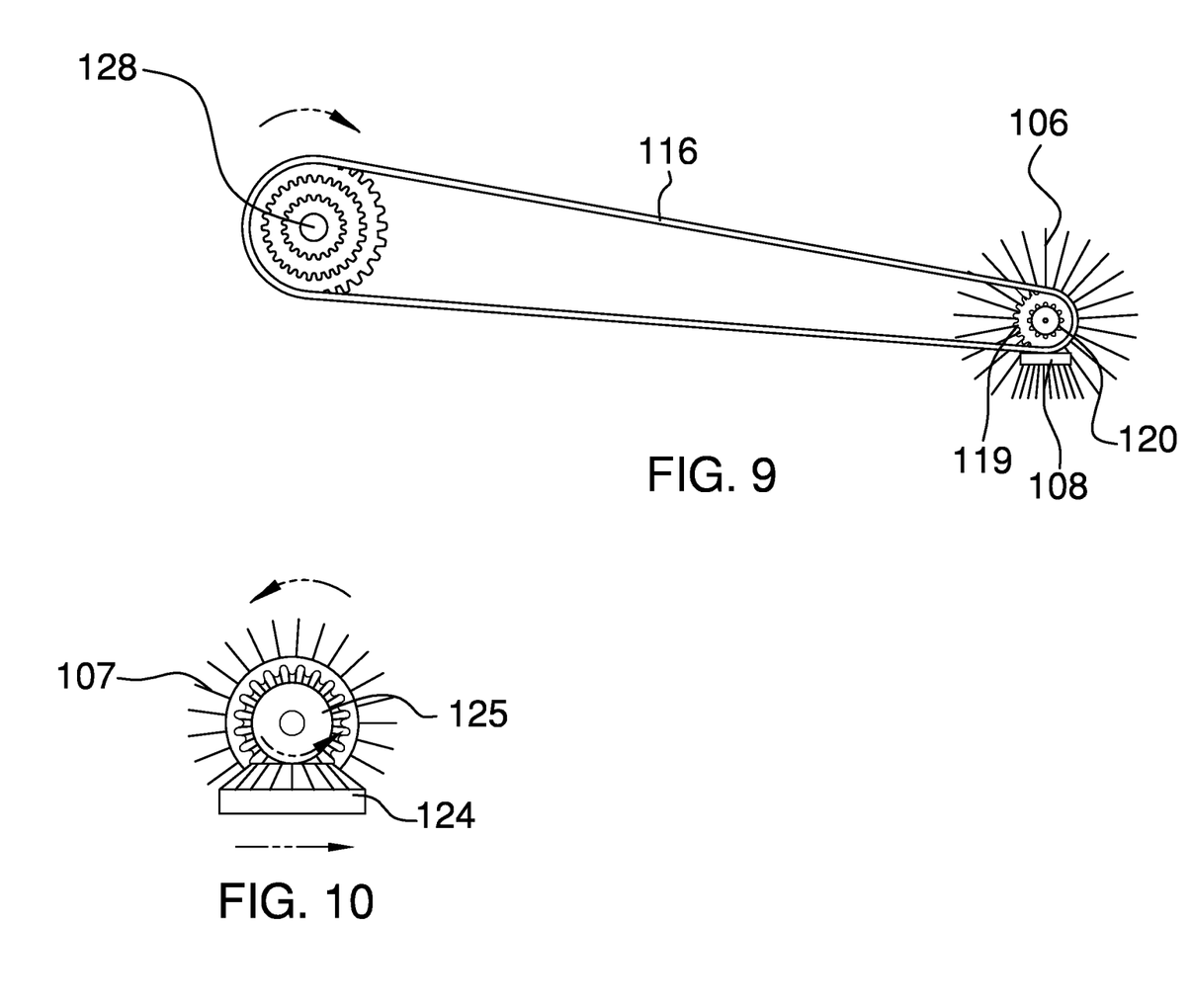
FIG. 9 is a detail view of an embodiment of the disclosure.
FIG. 10 is a detail view of an embodiment of the disclosure.
Figure 11:
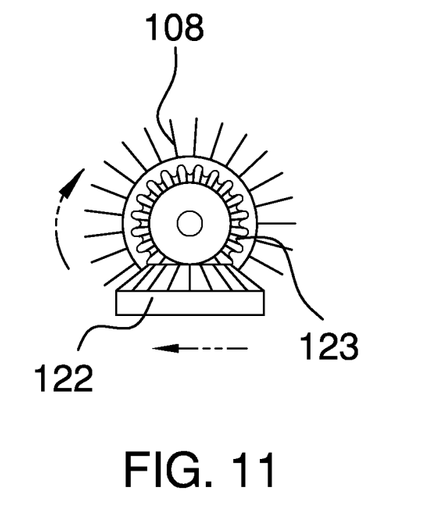
FIG. 11 is a detail view of an embodiment of the disclosure.
Figure 12:
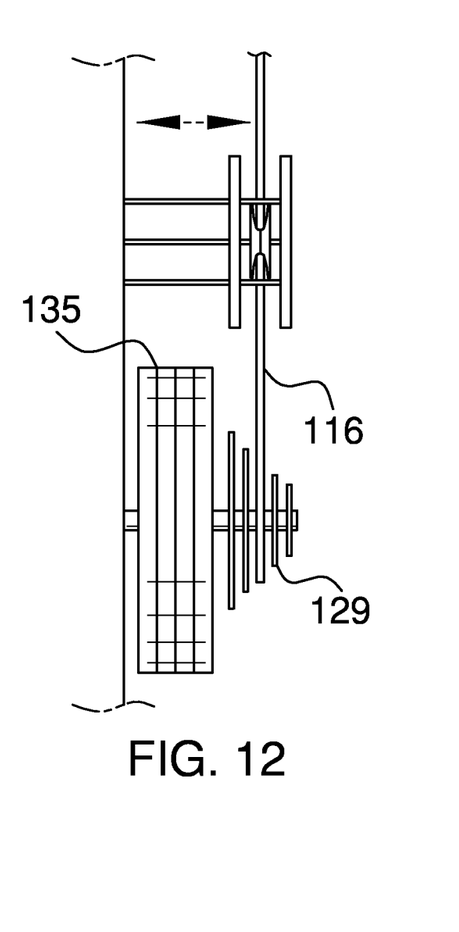
FIG. 12 is a detail view of an embodiment of the disclosure.

Detailed reference will now be made to a first potential embodiment of the disclosure, which is illustrated in FIGS. 1 through 12. The manually operated floor sweeper 100 (hereinafter invention) comprises a plurality of brushes 101, a hopper system 102, a drive system 103, a gearing system 104 and a body 105.

The plurality of brushes 101 further comprises a cleaning brush 106, a left feeder brush 107 and a right feeder brush 108. The cleaning brush 106 is a whisker brush. A whisker brush is made in the shape of a cylinder where the bristles of the whisker brush extend out from the center axis of the cylinder. The cleaning brush 106 is mounted on the front 163 side of the invention 100 such that a center axis 199 of the whisker brush runs parallel to the surface to be cleaned 167. When viewed from the right 164 side of the invention 100, the cleaning brush 106 rotates in the clockwise direction. The rotation of the cleaning brush 106 pushes dirt and debris 157 on to a trash tray 109 that is discussed elsewhere in this disclosure.

The left feeder brush 107 and the right feeder brush 108 are each round brushes. A round brush comprises a disc with a series of bristles that extend perpendicularly from one of the surfaces of the disk towards the surface to be cleaned 167. The disk rotates around its center point moving the bristles in a circular fashion. The left feeder brush 107 is mounted on the left 166 side of the invention 100 in front 163 of the cleaning brush 106. When viewed from the top 162, the left feeder brush 107 rotates in a clockwise fashion. The rotation of the left feeder brush 107 pushes dirt and debris 157 into the path of the cleaning brush 106.

The right feeder brush 108 is a round brush. The right feeder brush 108 is mounted on the right 164 side of the invention 100 in front 163 of the cleaning brush 106. When viewed from the top 162, the right feeder brush 108 rotates in a counter-clockwise fashion. The rotation of the right feeder brush 108 pushes dirt and debris 157 into the path of the cleaning brush 106. The rotation of the cleaning brush 106, left feeder brush 107 and right feeder brush 108 is discussed elsewhere in this disclosure.

The hopper system 102 further comprises the trash tray 109, a trash conveyor 110, a hinge 111, a screen 112, a reel 113, a reel rope 114, and a reel rope guide 115.

The purpose of the trash tray 109 is to receive dirt and debris 157 pushed on to it from the cleaning brush 106. The trash tray 109 is a flat rectangular first plate 171 that is mounted on the front 163 of the invention 100 behind the cleaning brush 106. The trash tray 109 extends from the left 166 side of the invention 100 to the right 164 side of the invention 100 so that the carrying surface of the first plate 171 is parallel to the surface to be cleaned 167.

The trash tray 109 is attached to the trash conveyor 110. The trash conveyor 110 further comprises a second plate 172 and a third plate 173. The second plate 172 and the third plate 173 are joined so that the second plate 172 and the third plate 173 are perpendicular to each other. The second plate 172 is parallel to the first plate 171. A hinge 111 is used to attach the rear 165 edge of the trash tray 109 to the front 163 edge of the second plate 172. The hinge 111 allows the trash tray 109 to rotate away from the surface to be cleaned 167 using the hinge 111 as a pivot point.

The screen 112 is a wire mesh screen that is mounted on the top 162 side of the first plate 171 of the trash tray 109, over the hinge 111 and the top 162 side of the second plate 172 of the trash conveyor 110. The purpose of the screen 112 is to prevent dirt and debris 157 from falling through the area where the trash tray 109, hinge 111, and trash conveyor 110 are joined. The trash conveyor 110 is connected to a left conveyor guide 158 and a right conveyor guide 159. The left conveyor guide 158 and the right conveyor guide 159 are structural components at the front 163 side of the body 105. The left 166 side of the trash conveyor 110 is attached using a left split ring hanger 181 that is tightened enough to hold trash conveyor 110 to the left conveyor guide 158 but loosely enough to allow the trash conveyor 110 to move. The right 164 side of the trash conveyor 110 is attached using a right split ring hanger 182 that is tightened enough to hold trash conveyor 110 to the right conveyor guide 159 but loosely enough to allow the trash conveyor 110 to move.

The trash conveyor 110 can be raised or lowered using the reel 113, reel rope 114, and reel rope guide 115. The reel 113, reel rope 114, and reel rope guide 115 can be mounted on either the right 164 or left 166 side of the invention 100.

In the first potential embodiment of the invention 100 the reel 113, reel rope 114, and reel rope guide 115 are mounted on the right 164 side of the invention 100. The reel rope 114 is wound on the reel 113 and is further defined with a free end 160 that is not attached to the reel 113. The free end 160 of the reel rope 114 is threaded from the reel 113, through the reel rope guide 115 and is attached to the trash conveyor 110. The free end 160 of the reel rope 114 can be connected to the trash connector by tying the free end 160 of the reel rope 114 to a ring screw 192 mounted into the third plate 173 of the trash conveyor 110. The reel rope guide 115 is a bent tube that is mounted on the side of the body 105. The purpose of the reel rope guide 115 is to change the direction of the reel rope 114. This change of direction allows the reel rope 114 to pull up on the trash conveyor 110 more vertically while allowing the reel 113 to be mounted towards the rear 165 of the invention 100, which is closer to the user. To raise the trash conveyor 110, the reel 113 is turned so that the reel rope 114 is wound into the reel 113. To lower the trash conveyor 110, the reel 113 is turned to pay out the reel rope 114.

The purpose of the drive system 103 is to rotate each of the plurality of brushes. The drive system 103 is further comprises a first chain 116, a first sprocket 119, a second sprocket 120, a third sprocket 121 a fourth sprocket 122, a fifth sprocket 123, a sixth sprocket 124 a seventh sprocket 125. The first chain 116 is a drive chain that connects a cogset 128, which is discussed elsewhere in this disclosure, to the first sprocket 119.

The first sprocket 119 is mounted on the cleaning brush 106 so that the center rotational axis of the first sprocket 119 is aligned with the rotational axis 199 of the cleaning brush 106. When the cogset 128 turns, the first chain 116 drives the first sprocket 119, which rotates the cleaning brush 106. Mounted next to the first sprocket 119 is the second sprocket 120, which turns with the first sprocket 119.

The fifth sprocket 123 is mounted on the right feeder brush 108 so that the center rotational axis of the fifth sprocket 123 is aligned with the center rotational axis of the right feeder brush 108. The rotation of the fifth sprocket 123 turns the right feeder brush 108. The fifth sprocket 123 is in direct mechanical connection with the fourth sprocket 122. As the second sprocket 120 turns, the fourth sprocket 122 rotates. The fourth sprocket 122 is perpendicularly oriented with respect to the fifth sprocket 123. The teeth of the fifth sprocket 123 are intermeshed with the teeth of the fourth sprocket 122 so that the rotation of the fourth sprocket 122 will rotate the fifth sprocket 123. On the right 164 side of the cleaning brush 106 is mounted the fourth sprocket 122. The fourth sprocket 122 rotates the fifth sprocket 123, which in turn rotates the right feeder brush 108.

The seventh sprocket 125 is mounted on the left feeder brush 107 so that the center rotational axis of the seventh sprocket 125 is aligned with the center rotational axis of the left feeder brush 107. The rotation of the seventh sprocket 125 turns the left feeder brush 107. The seventh sprocket 125 is in direct mechanical connection with the sixth sprocket 124. As the sixth sprocket 124 turns, the seventh sprocket 125 rotates. The sixth sprocket 124 is perpendicularly oriented with respect to the seventh sprocket 125. The teeth of the seventh sprocket 125 are intermeshed with the teeth of the sixth sprocket 124 so that the rotation of the sixth sprocket 124 will rotate the seventh sprocket 125. On the left 166 side of the cleaning brush 106 is mounted the sixth sprocket 124. The sixth sprocket 124 rotates the seventh sprocket 125, which in turn rotates the left feeder brush 107.

The purpose of the gearing system 104 is to change the rotational speed of each of the plurality of brushes 101. The gearing system 104 further comprises a gear plate 126, a cogset 128, a plurality of flexible joints 129, a plurality of stationary joints 130, a plurality of flexible stems 131, a gear gauge arm 132 and a gauge stand 133.

The purpose of the cogset 128 is to provide a selection of sprockets of differing size to be used as the initial sprocket in the drive system 103. By changing the sprocket size of the cogset 128, the speed of rotation of the cleaning brush 106, right feeder brush 108, and left feeder brush 107 are changed. In the first potential embodiment of the invention 100, the cogset 128 is mounted on a right front wheel 135 of the invention 100 such that the cogset 128 faces away from the body 105. The first chain 116 is moved between the sprockets of the cogset 128 using the gear plate 126. The gear plate 126 further comprises an inner plate 185, an outer plate 186, a first chain guide 187 and a second chain guide 188.

The inner plate 185 and outer plate 186 are identical. The first chain guide 187 and second chain guides 188 are identical and act as rotating channels through which the first chain 116 is routed. The first chain guide 187 and second chain guide 188 are mounted between the inner plate 185 and the outer plate 186. The gear plate 126 is mounted on the invention 100 so that the inner plate 185 is nearest the body 105. By moving the position of gear plate 126 relative to the body 105, the relative position of the first chain 116 to the cogset 128 is changed which moves the first chain 116 to a different sprocket on the cogset 128.

The position of the gear plate 126 relative to the body 105 is changed using the plurality of flexible joints 129, the plurality of stationary joints 130, the plurality of flexible stems 131, the gear gauge arm 132 and the gauge stand 133. The purpose of the gear gauge arm 132 is to act as a lever that allows the user to shift the relative positions of the plurality of flexible joints 129, the plurality of stationary joints 130, and the plurality of flexible stems 131 to change the position of the gear plate 126 relative to the body 105. The purpose of the gear gauge is to hold the gear gauge arm 132 in place to keep the gear plate 126 from inadvertently slipping. Mechanical devices incorporating levers, flexible joints, stationary joints, and flexible stems are well known and documented in the art.

The body 105 further comprises a plurality of wheels 134, a frame 139, the left conveyor guide 158 and the right conveyor guide 159, a foot stand 140, a right tipping stand 141, a left tipping stand 142, a particle guard 143, a frame arm 144, a receptacle 145, a dirt pan stand 146, a spear case 149, a spear tube 150, a broom stand 151, a shovel stand 154, and a plurality of utility pouches 191.

The frame 139 comprises a platform 189 and a container 190. The platform 189 is a solid piece of wood, metal, or plastic upon which the container 190, the right rear wheel 137, the left rear wheel 138, the left conveyor guide 158, the right conveyor guide 159, the foot stand 140, the right tipping stand 141, and the left tipping stand 142 are mounted. The foot stand 140 is placed on the rear 165 edge of the platform 189. The right tipping stand 141 is placed on the right side 164 of the rear 165 edge of the platform 189. The left tipping stand 142 is placed on the left 166 side of the rear 165 edge of the platform 189. The purpose of the foot stand 140, the right tipping stand 141 and the left tipping stand 142 is to provide a leverage point that allows the user to step on these points and to rotate the invention 100 using the right rear wheel 137 and left rear wheel 138 as a pivot point. This makes it easier to move the invention 100 over obstacles such as steps and curbs.

The plurality of wheels 134 further comprises the right front wheel 135, a left front wheel 136, the right rear wheel 137, and the left rear wheel 138. The right front wheel 135 and the left front wheel 136 are both heavy duty inflatable tires that are suitable for both indoor and outdoor use. The right front wheel 135 is mounted on the right 164 side of the container 190 using commercially available bearings and hardware. The left front wheel 136 is mounted on the left 166 side of the container 190 using commercially available bearings and hardware. The right rear wheel 137 and left rear wheel 138 are both commercially available heavy duty swivel casters that are mounted on the bottom 161 side of the platform 189.

The container 190 is a solid sided but open topped container upon which the rest of the invention 100 is built.

The container 190 is made as a single unit of plastic. The interior of the frame 139, as accessed through the top 162 side opening, is the receptacle 145. The purpose of the receptacle 145 is to hold the dirt and debris 157 collected by the trash conveyor 110. The particle guard 143 is a plastic guard that rises above the top 162 side of the container 190 and shields the user from the dirt and debris 157 that is placed in the receptacle 145. The frame arm 144 is a handle that allows the user to push the invention 100.

Except where otherwise noted, the gearing system 104 and the reel 113, reel rope 114, and reel rope guide 115, dirt pan stand 146, broom stand 151, shovel stand 154, spear case 149 spear tube 150, and the plurality of utility pouches 191 are all mounted on the container 190. The dirt pan stand 146 further comprises a dirt pan tray 147 and a dirt pan handle latch 148. The purpose of the dirt pan tray 147 is to receive and securely hold the tray of a dirt pan. The purpose of the dirt pan handle latch 148 is to receive and securely hold the handle of a dirt pan. The broom stand 151 further comprises a broom stand tray 152 and a broom stand latch 153. The purpose of the broom stand tray 152 is to receive the bristled end of a broom. The purpose of the broom stand latch 153 is to receive and securely hold the broomstick. The shovel stand 154 further comprises a shovel stand tray 155 and a shovel stand latch 156. The purpose of the shovel stand tray 155 is to receive and securely hold the blade of a shovel. The purpose of the shovel stand latch 156 is to receive and securely hold the handle of a shovel. A rod or pole can be stored in the invention 100 by inserting the rod or pole through the spear tube 150 and placing an end of the rod or pole through the spear tube 150 and securing the end in the spear case 149. The purpose of the plurality of utility pouches 191 is to provide the user with a place to store cleaning supplies such as soaps or trash bags.

In the first potential embodiment of the disclosure, the gearing system 104, the reel 113, reel rope 114, and the shovel stand 155 are mounted on the right 164 side of the container 190. The dirt pan stand 146, the spear case 149, spear tube 150, and the broom stand 151 are mounted on the left 166 side of the container 190. The plurality of utility pouches 191 are mounted on the rear 165 side of the container 190.

To use the invention 100, the user pushes the invention 100 forward. This rotates the cleaning brush 106, right feeder brush 108 and the left feeder brush 107. The cleaning brush 106, right feeder brush 108 and the left feeder brush 107 move dirt and debris 157 into the trash tray 109 and trash conveyor 110. When the trash tray 109 and trash conveyor 110 are full, the trash tray 109 is rotated and the reel 113 is turned to raise the trash conveyor 110. When the trash conveyor 110 reaches the top 162 side of the container 190, the dirt and debris 157 is dumped into the receptacle 145. The reel 113 is turned to return the trash conveyor 110 to its original position. To change the speed of rotation of the plurality of brushes 101, the gear gauge arm 132 is moved and locked into a new position by the gauge stand 133. Optionally a broom can be stored in the broom stand 151, a dirt pan can be stored in the dirt pan stand 146, a shovel can be stored in the shovel stand 155 and rod or pole rod can be stored in the spear case 149 and spear tube 150.

The directional references used in this disclosure correspond to those of a user pushing the invention 100. The plurality of wheels 134 are mounted on the bottom 161 side of the invention 100. The side distal to the bottom 161 side is the top 162 side. The plurality of brushes 101 are mounted on the front 163 side of the invention 100. When viewed from the top 162 side the remaining sides, moving clockwise from the front 163 side, are called the right 164 side, the rear 165, and the left side 166.

With respect to the above description, it is to be realized that the optimum dimensional relationship for the various components of the invention described above and in FIGS. 1 through 12, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A manually operated floor sweeper comprising:
a plurality of brushes, a hopper system, a drive system, a gearing system and a body;
wherein the manually operated floor sweeper is adapted for indoor and outdoor use;
wherein the rotational speed of the plurality of brushes is adjustable;
wherein the plurality of brushes further comprises a cleaning brush, a left feeder brush and a right feeder brush;
wherein the left feeder brush pushes dirt and debris into the path of the cleaning brush;
wherein the right feeder brush pushes dirt and debris into the path of the cleaning brush;
wherein the gearing system changes the rotational speed of each of the plurality of brushes;
wherein the hopper system further comprises the trash tray, a trash conveyor, a hinge, a screen, a reel, a reel rope, and a reel rope guide.

2. The manually operated floor sweeper according to claim 1 wherein the hopper receives the dirt and debris pushed onto it by the cleaning brush.

3. The manually operated floor sweeper according to claim 2 wherein the drive system rotates each of the plurality of brushes.

4. The manually operated floor sweeper according to claim 1 wherein the drive system further comprises a first chain, a second chain, a third chain, a first sprocket a second sprocket, a third sprocket a fourth sprocket, a fifth sprocket, a sixth sprocket, and a seventh sprocket.

5. The manually operated floor sweeper according to claim 4 wherein the gearing system further comprises a gear plate, a cogset, a plurality of flexible joints, a plurality of stationary joints, a plurality of flexible stems, a gear gauge arm and a gauge stand.

6. The manually operated floor sweeper according to claim 5 wherein the cleaning brush is a whisker brush;
wherein the cleaning brush is mounted on the front side of the manually operated floor sweeper;
wherein the left feeder brush is a round brush;
wherein the left feeder brush is mounted in front of the cleaning brush;
wherein the right feeder brush is a round brush;
wherein the right feeder brush is mounted in front of the cleaning brush.

7. The manually operated floor sweeper according to claim 6 wherein the trash tray receives dirt and debris pushed on to it from the cleaning brush;
wherein the trash tray is attached to the trash conveyor with a hinge.

8. The manually operated floor sweeper according to claim 7 wherein the trash conveyor can be raised or lowered using the reel, reel rope, and reel rope guide.

9. The manually operated floor sweeper according to claim 6 wherein the cogset turns the first chain;
wherein the first chain drives the first sprocket;
wherein the first sprocket rotates the cleaning brush.

10. The manually operated floor sweeper according to claim 9 wherein the first sprocket rotates the second sprocket;
wherein the second sprocket rotates the fourth sprocket;
wherein the fifth sprocket is mounted on the right feeder brush so that the center rotational axis of the fifth sprocket is aligned with the center rotational axis of the right feeder brush;
wherein the rotation of the fifth sprocket turns the right feeder brush;
wherein the fifth sprocket is in direct mechanical connection with the fourth sprocket;
wherein as the second sprocket turns, the fourth sprocket rotates;
wherein the fourth sprocket is perpendicularly oriented with respect to the fifth sprocket;
wherein teeth of the fifth sprocket are intermeshed with teeth of the fourth sprocket so that the rotation of the fourth sprocket will rotate the fifth sprocket;
wherein on the right side of the cleaning brush is mounted the fourth sprocket;
wherein the fourth sprocket rotates the fifth sprocket, which in turn rotates the right feeder brush;
wherein the seventh sprocket is mounted on the left feeder brush so that the center rotational axis of the seventh sprocket is aligned with the center rotational axis of the left feeder brush;
wherein the rotation of the seventh sprocket turns the left feeder brush;
wherein the seventh sprocket is in direct mechanical connection with the sixth sprocket;
wherein as the sixth sprocket turns, the seventh sprocket rotates;
wherein the sixth sprocket is perpendicularly oriented with respect to the seventh sprocket;
wherein teeth of the seventh sprocket are intermeshed with the teeth of the sixth sprocket so that the rotation of the sixth sprocket will rotate the seventh sprocket;
wherein on the left side of the cleaning brush is mounted the sixth sprocket;
wherein the sixth sprocket rotates the seventh sprocket, which in turn rotates the left feeder brush.

11. The manually operated floor sweeper according to claim 6 wherein the cogset comprises a plurality of sprocket;
wherein the first chain is moved between the each of the plurality of sprockets of the cogset using the gear plate;
wherein the cogset is mounted on one of the plurality of wheels.

12. The manually operated floor sweeper according to claim 11 wherein moving the position of gear plate relative to the body changes the position of the first chain within the cogset.

13. The manually operated floor sweeper according to claim 12 wherein the gear plate further comprises an inner plate, an outer plate, a first chain guide and a second chain guide;
  wherein the inner plate and outer plate are identical;
  wherein the first chain guide and second chain guide are identical;
  wherein the first chain guide and second chain guide act as channels through which the first chain is routed.

14. The manually operated floor sweeper according to claim 13 wherein the position of the gear plate relative to the body is changed using the plurality of flexible joints, the plurality of stationary joints, the plurality of flexible stems, the gear gauge arm and the gauge stand.

15. The manually operated floor sweeper according to claim 6 wherein the body further comprises the plurality of wheels and a frame;
  wherein the frame further comprises a platform and a container;
  wherein the plurality of wheels further comprises a right front wheel, a left front wheel, the right rear wheel, and the left rear wheel;
  wherein the container, the right rear wheel, the left rear wheel, the left conveyor guide, the right conveyor guide, a foot stand, a right tipping stand, and a left tipping stand are mounted on the platform;
  wherein the front right wheel and the front left wheel are mounted on the container.

16. The manually operated floor sweeper according to claim 15 wherein the container is a solid sided but open topped container;
  wherein the interior of the container holds the dirt and debris collected by the trash conveyor.

17. The manually operated floor sweeper according to claim 16 wherein the reel, the reel rope guide, a dirt pan stand, a broom stand, a shovel stand, a spear case, a spear tube, and a plurality of utility pouches are mounted on the container.

* * * * *